United States Patent [19]
Echols

[11] 4,120,083
[45] Oct. 17, 1978

[54] METHOD OF PIPE JOINING

[75] Inventor: Marvin C. Echols, Houston, Tex.

[73] Assignee: Zap-Lok Systems International, Inc., Houston, Tex.

[21] Appl. No.: 747,726

[22] Filed: Dec. 6, 1976

[51] Int. Cl.² .......................... B23P 3/00; B23P 25/00
[52] U.S. Cl. ........................................ 29/458; 29/525; 285/55; 285/374
[58] Field of Search .................. 29/458, 525; 285/374, 285/55

[56] References Cited
U.S. PATENT DOCUMENTS

| 2,273,154 | 2/1942 | Stromsoe | 29/458 UX |
| 2,741,498 | 4/1956 | Elliott | 29/525 X |
| 3,210,102 | 10/1965 | Joslin | 285/374 |
| 3,466,738 | 9/1969 | Mount | 29/525 |
| 3,909,045 | 9/1975 | Meagher | 285/374 X |

*Primary Examiner*—Charlie T. Moon

[57] ABSTRACT

Mechanical pipe joints of the pin and bell variety, and methods of forming same, wherein the ends are preformed so as to permit a controlled interference fit upon joining and preferably provide a double seal against both internal and external pressure, the joints being particularly adapted for field-grade materials, aluminum members, and internally and externally coated members and being readily disengagable and re-formable without producing galling.

7 Claims, 6 Drawing Figures

METHOD OF PIPE JOINING

BACKGROUND OF THE INVENTION

1. Field of the Invention

The present invention relates generally to methods of forming mechanical joints between lengths of pipe and more particularly to pipe of the type and quality typically utilized in oil field applications, such as gathering lines for distribution systems down-hole casing, and the like, and to the joints so formed. It is particularly adapted for joining materials heretofore considered highly difficult if not impossible to join mechanically with consistent reliability, namely, plain aluminum pipe and steel pipe.

2. Description of the Prior Art

The literature contains many schemes for mechanically joining pipes, tubing and the like, only a few of which have proved actually capable of forming leak-free joints with oil-field materials. One such method known to be actually operative is that disclosed in U.S. Pat. No. 3,208,136. Such patent discloses a pipe-joining method consisting essentially of forming a bell on one pipe end, rolling an annular groove in another pipe end, and telescoping the latter into the former. Additionally, one or the other of the two surfaces was typically coated with a liquid lubricant-sealant prior to the joining of the pipes. Related U.S. Pat. No. 3,210,102 discloses the coupling or joint essentially formed by the above-described method.

U.S. Pat. No. 3,466,738 discloses a method of joining pipe consisting essentially of simply forcing together two pipe ends of like diameter, the only preparatory step being the slight flaring of one tip in order to permit the initial entry of the other. The amount of force and the time required to so join two such pipe ends is many times greater than that required by the method of the present invention, and it is likely that galling of the parts can occur.

SUMMARY OF THE INVENTION

The present invention is directed to the formation of high integrity, reliable mechanical joints of the pin and bell variety. Although applicable to tubular elements of precision manufacture and/or finishing, it is particularly applicable to tubular goods such as field-grade pipe, down-hole casing, and the like which are subject to variation in dimensions and quality. It is also particularly well suited for joining tubular goods heretofore considered highly difficult if not impossible to join mechanically with consistent reliability, namely, aluminum and steel pipe, and pipe which has been coated both internally and externally. Additionally, it is well suited for forming joints from elements coated with brittle material, and it permits the joining of externally-coated pipe without a subsequent "field joint."

The invention involves pre-forming the ends of the pipe to be joined in such a manner as to permit a controlled "minimum interference fit" upon joining. One end is expanded, both elastically and inelastically, into a bell-shaped configuration which has, after "snap-back" from expansion, a minimum interference dimension with respect to a pin having the maximum A.P.I allowable deviations. An annular groove of desired configuration is preferably formed on the pin end as close as possible to the end of the pin to act as a reservoir for a sealant and provide a secondary seal. The pin end is preferably coated with a lubricant-sealant for lubrication during the joining process. The leading portion of the end of pin is mechanically worked to a tapered configuration such that the bearing pressure between the pin and bell, upon engagement of the pin with the bell is always insufficient to producing galling. The portion of the pin beyond the leading portion preferably is not worked because the bell is sized to accommodate the maximum expected variation in dimension of this portion. In certain other aspects of the present invention the location of interior and exterior coating is controlled.

Alternate embodiments of the invention, as well as the preferred form of the invention itself, will be more fully understood by reference to the description below.

BRIEF DESCRIPTION OF THE DRAWINGS

FIG. 2a illustrates the protection afforded the coating material during initial contact by a misaligned pin member whereas

DESCRIPTION OF THE PREFERRED EMBODIMENTS

Figure 1:
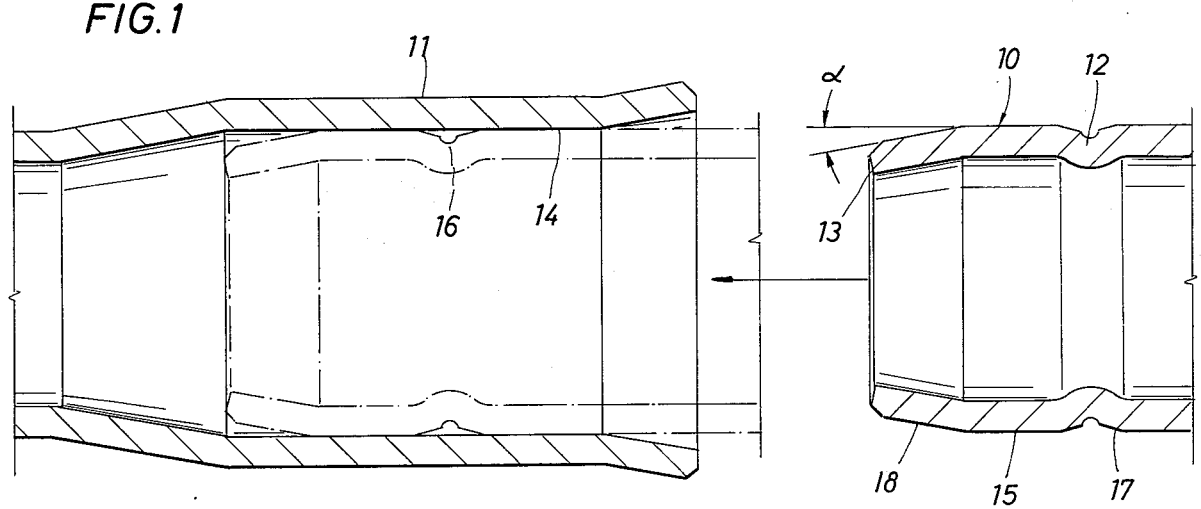
FIG. 1 is an enlarged sectional view of bell and pin ends formed for joining plain or uncoated pipe, the dotted portion of which illustrates the position of the pin end after formation of the joint.

A preferred embodiment for joining plain, uncoated tubular elements, whether of "hard" material such as steel or of "soft" material such as aluminum, is illustrated in FIG. 1. In FIG. 1, the pin 10 is forced into the open end of the bell 11 to form a joint as illustrated by the pin outlined in dashed line in FIG. 1. The method employed to create the joint illustrated can best be understood by a step-by-step explanation for a given size tubular element. In the case of American Petroleum Institute "Schedule 40" steel pipe of nominal 4½-inch outside diameter (O.D.), the nominal wall thickness is 0.237 inch, resulting in a nominal inside diameter (I.D.) of 4.026 inches. It is an object of the present invention to obtain the "minimum interference fit" necessary to provide a strong joint while allowing for the maximum dimensional variation permitted by A.P.I. standards. Maximum gripping force between bell and pin, for most materials, is typically obtained at internal stresses near the elastic limit; any amount of interference greater than that which produces a practical maximum of gripping strength is not only unnecessary but actually undesirable. Such excess interference is unnecessary in that it produces little or no increase in gripping force, and is undesirable in that it both requires greater force for the subsequent joining operation and can produce galling between the materials being joined. The term "galling" as used herein refers to the effect of gouging a groove along the length of the pipe ends. The effect of "galling" is to permit leaks to occur when pressure is applied.

In accord with the present invention, a satisfactory "minimum interference fit" for steel has been determined to be approximately 0.005 inch per inch of outside diameter per 30,000 pounds of minimum specified yield. Actually, the precise dimension is 0.002 inch rather than 0.005 but the 0.005 figure compensates for miscellaneous irregularities which may be found in pipe. For a nominal 4.5-inch diameter pipe, then, the minimum desired interference is 0.0225 inch. A.P.I. standards on such pipe allow ±0.75% variation. A 4.5-inch diameter pipe with A.P.I. standards may thus be encountered with outside diameter as small as 4.46625 inches (4.50−[0.0075 × 4.50]). Thus, to allow for the minimum desired interference of 0.0225 inch, the bell must be expanded such that its maximum I.D. after "snap-back" is approximately 4.44 inches (4.46625−0.0225). Such sizing to obtain a "minimum interference fit" has been found to satisfactorily accommodate pin ends of pipe with the maximum positive A.P.I. variation without significantly increasing the force required for joining and while maintaining an adequate gripping force.

The relationship described above may be expressed in restated form as follows:

Max I.D. Bell = Min O.D. pin − 0.005X where

Max I.D. bell = "Snap-back" dimension in inches
Min O.D. pin = Smallest pin O.D. in inches
X = Nominal Pin O.D. in inches For aluminum pipe it is three times the value of steel or 0.015 inch because the modulus of elasticity of aluminum is three times that of steel.

The foregoing is usually sufficient to permit leak-free, strong joints to be formed between precision-made or precision-formed elements, but such high quality workpieces are not ordinarily encountered in actual practice. Also, joints which are only "usually" leak-free are unacceptable in the pipeline industry, the needs of which demand a leak-free joining rate of virtually 100%. To consistently achieve the high degree of reliability with tubular elements of typical oil-field quality, it has proved desirable to perform a preliminary forming operation on the pin 10. This is preferably accomplished by forming an annular groove 12 in the end of the pin 10, preferably as near the terminal end 13 of said pin 10 as conveniently obtainable. The reason for this is that the hydraulic pressure tends to expand the bell and a more effective seal is obtained by bringing the groove as close as possible to the end of the pin. By applying a lubricating sealant to either the inner surface 14 of the bell 11 or to the outer surface 15 of the pin 10, the region about the groove 12 will serve as a reservoir for sealant and a secondary seal 16 after make-up of the joint. The sealant in the groove 12 does not significantly contribute to the mechanical strength of the joint but does interdict any longitudinal interstitial voids which might otherwise, either singly or in combination, permit the joint to leak. Liberal application of the lubricating sealant will insure the filling of any macroscopic localized voids, such as between a localized flat spot on the pin end and the surrounding bell. The groove 12 need not indent the inner wall of the pin as illustrated but can be merely an indentation in the outer wall of the pipe.

In a preferred embodiment, the aforementioned groove 12 is formed with a beveled annular relief portion 17 adjacent the sides of the groove. Dependent upon the quality of the tubular goods to be joined it may be desirable to take the edge off the outside diameter of the pin. This can be done by mechanically working as by rolling, the extreme edge or lip 18 of the pin in order to remove any upset of material which otherwise could initiate deleterious galling in the bell. At the same time it is usually desirable to work at least part of the leading portion 18 of pin 10 such that said portion has a conical shape defined by an angle and relative to the outer surface of the pin. It has been found that, for "hard" materials such as steel, a nominal declination or angle of 4° is sufficient to reduce the bearing pressure upon insertion below that pressure which ordinarily produces galling.

Although alternate means are readily apparent to those skilled in the art, all of the forming operations on the pin end may be advantageously carried out in essentially one operation. U.S. Pat. No. 3,473,359 discloses a grooving device having three rollers spaced roughly circumferentially equidistant; such a grooving device may be readily adapted for performing all of the foregoing pin forming operations by replacing two of said rollers with "nose" and "finishing" rollers. The nose roller is preferably spaced longitudinally from the grooving roller and is adapted (1) to remove any upset of material which may be present at the extreme edge or outer lip 13 of the pin and/or (2) to mechanically work, if desired, at least part of the leading portion 18 of pin such that said portion 18 is turned down the desired small angle α. The finishing roller is adapted to turn down any ridges which may be present adjacent the groove. Additionally, the described roll-forming operation reduces the deviation from a perfect circle or "out-of-roundness" of the pin end, and does so with no possibility of galling the pin as may occur with other forming procedures such as swaging.

The desired pre-forming operations may be carried out most advantageously in a steel mill, pipe yard, or other locale prior to distribution of the material to the job site. In actual field tests of pipe to be joined to form a pipeline, several sections of pre-formed pipe were pre-distributed at various points along the pipeline right-of-way. An improved device of the general type as shown and described in U.S. Pat. No. 3,503,244 was set up at one such point and the pipe was then, seriatim, swabbed with lubricating sealant, stabbed, made-up, and pulled through the joining device by a tractor. In this manner, an inexperienced crew of only three, including the tractor operator, was able to achieve a "production" joining rate of one 40 foot joint of pipe per 60 seconds.

Heretofore it has been considered highly difficult if not impossible to join aluminum pipe with consistent reliability and economy. Aluminum has heretofore presented special difficulties because of certain of its unusual characteristics, two of which are (1) the extremely low bearing pressure at which a cold pressure-weld occurs, and (2) the extremely high coefficient of friction between two smooth aluminum parts. Depending upon the quality of the workpieces, the present invention as described above overcomes these difficulties and satisfactorily accomplishes the objects of the present invention. To insure reliable joints to the degree required in the pipeline industry it is preferred to use a high-film-strength lubricant-sealant in the formation of the joint as above described.

Figure 2:
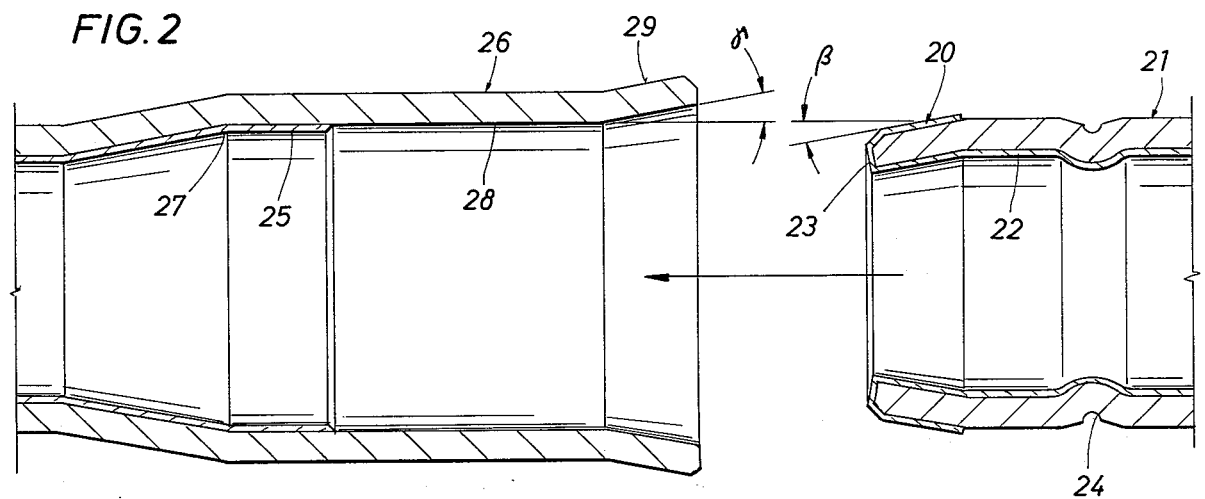
FIG. 2 is a similarly enlarged sectional view of bell and pin ends formed for joining coated pipe, and illustrates a preferred arrangement for internal coating.
Figure 2A:
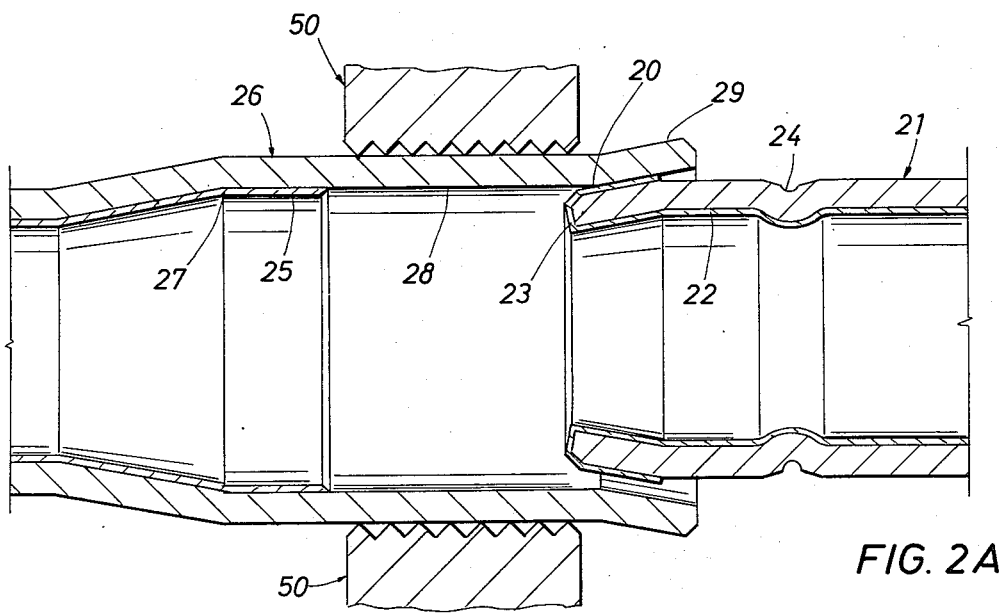
Figure 2B:
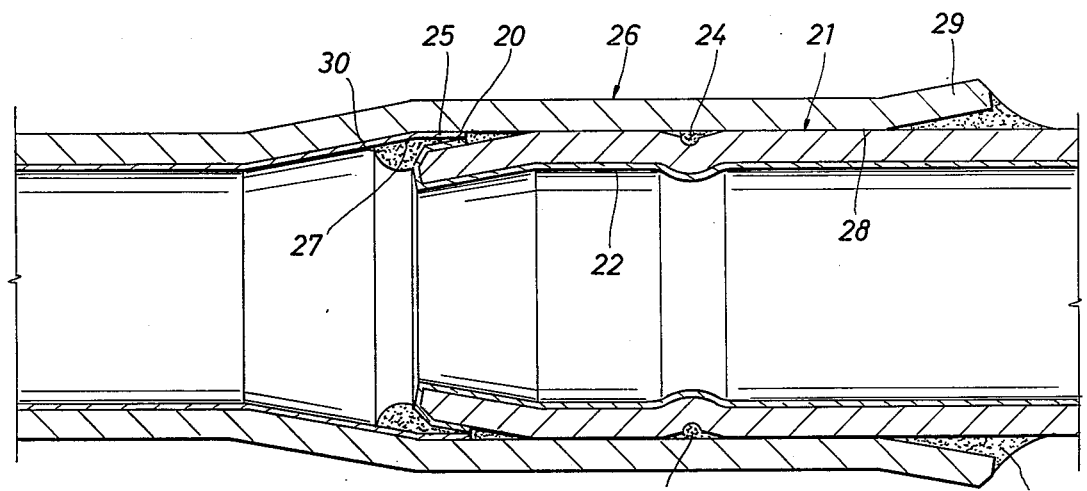
FIG. 2b illustrates the completed joint with the resultant deposits of sealant.

The application of the present invention for joining pipe or other tubular goods which are internally coated may be best understood by reference to FIG. 2, 2A and 2B. For this application, it is preferred to turn down or taper the leading portion or nose 20 of the pin 21 to typical values of a declination or inward angle on the order of 10° with respect to the wall surface of the pin. As will be seen, the present invention permits a complete overlapping of the internal coating of a pin and bell while simultaneously permitting greater tolerance on the joint makeup length or insertion depth.

In the embodiment illustrated, the internal coating 22 of the pin 21 does not terminate at edge 23 but continues around the end of the pipe and up the outside of the turned down portion 20 of the pin, up to a point near but short of outer diameter of the pin. The internal coating 25 of the bell end 26 preferably extends a convenient distance past the junction of expansion shoulder 27 and the expanded straight portion 28 of bell 26, but need not extend to the outer flare 29 at the end of the bell. The inclination or outward angle γ of flare 29 or outwardly extending taper may be any convenient small angle of lesser magnitude than the declination angle B of taper on the end of pin 21. Satisfactory results have been obtained with inclination and declination angles of 4° and 10°, respectively. As shown in FIG. 2A, such an angular difference has been found adequate to protect the coating on the outer part 20 of the pin from contacting the inside surface of the flare 29 during the "stabbing" or initial insertion of the pin into the flared end of the bell of the joining procedure, even though the members prior to stabbing be initially somewhat misaligned. Subsequent to stabbing, the members to be joined are in alignment, and the coating on the exterior Nose portion 20 of the pin cannot come into contact with the bell 26 during the remainder of the joining process. Insertion is nominally halted at the depth at which the pin and bell coatings overlap (See FIG. 2B), but a slight overrun in insertion depth can be tolerated without adverse consequences. As illustrated by FIG. 2B, the completed joint is seen to be "holiday free" (no bare spots) in that the internal coatings 27 and 22 of the bell and pin overlap in such a manner that no bare metal is exposed on the interior portion of the joint. Additionally, the wiping action of the joining process insures that a wedge 30 of sealant occupies what otherwise would be the void between the coated inner portion of the bell member and the coated turned-down portion of the pin thereby providing additional protection against the subsequent development of "holidays" as well as providing a pressure seal.

A double seal is provided against internal pressure in the pipe by the wedge 30 and the sealant 31 contained within the groove 24. With respect to pressure external of the pipe, a double seal is provided by sealant wedge 32 between the flare 29 and pin 21 and by the sealant 31 in the groove 24.

The present invention as described for application to internally coated members provides several advantages over previous means for joining internally coated pipe. Heretofore, such coatings had to be flexible, tapered at the end on the inside of the bell, and coated on the edge of the pin end up to the outer surface of the pipe. The first requirement eliminated the many applications which required a harder but more brittle coating, and the latter two were extremely difficult if not impossible to achieve consistently. Additionally, extremely precise make up of the pipe ends was required (to within 1/64 of an inch). Even such precision on insertion depth did not always produce satisfactory results; the bevel dimension on the pin end could vary sufficiently even within A.P.I. standards that the coating was frequently sheared off the bell and pin during joining. Also, since there was almost no overlap of coating upon even successful joining, the single-thickness seal was not reliable and occasional "holidays" resulted.

With the joint disclosed, the coating can be either flexible or brittle, there is no requirement for tapering inside the bell, and the difficult task of coating the edge of the pin end up to its outside diameter is eliminated. For the reasons explained earlier, the coating is not damaged during stabbing or makeup, and a substantially overlapping seal is easily effected. Additionally, considerably greater tolerance of makeup depth is obtained, thereby eliminating the need for precision control of insertion depth. An additional protection against "holidays" is provided by the substantial sealant wedge between nose and bell which always provides a coating-to-coating seal.

It has been found that the normal joining method allows the bell to expand to a degree which sometimes permits brittle interior coatings 25 to crack. This disadvantageous feature is eliminated by the use of exterior slips 50 designed to grip and contain the outside of the bell rather than the pipe behind the bell. When the bell slips are used, the bell is prevented from substantially deforming, outwardly, and such deformation as does occur is in compression of the pin member. Since such linings can withstand greater deformation in compression than in tension, the internal lining of the pin member does not crack during compression of the pin. As the pin member is compressed to accommodate the necessary deformation, the member becomes progressively stronger and provides greater resistance to compression. Thus it is possible for quite high inelastic stresses to be created in the pin member, which stresses, while high enough to expand the bell slightly upon its release from the slips, or other pipe gripping devices, are not large enough to overcome the greater resistance of the pin member and be dissipated in further deformation of said pin member. The subsequent expansion of the bell, however, is always small enough so that its brittle lining does not break upon release of the bell slips.

The bell slips 50, of course, may be used in conjunction with any of the described joints, and are especially valuable in the prevention of splits in the bells of pipe of lesser quality.

Still another embodiment permits the mechanical joining of externally coated pipe or, upon combination with the joint as described immediately above, of pipe which is coated both internally and externally. To avoid marring or destroying the external coating, it is preferred to use external pipe gripping device or slips 51 coated with an elastomer 52 of lower durometer than the external coating. A particularly attractive advantage of this joint compared to those produced by conventional methods is that it permits the joining of externally-coated pipe without the necessity of a "field joint"; i.e., without the application of coating material to the exposed ends in the field after the completion of the joint.

Figure 3A:
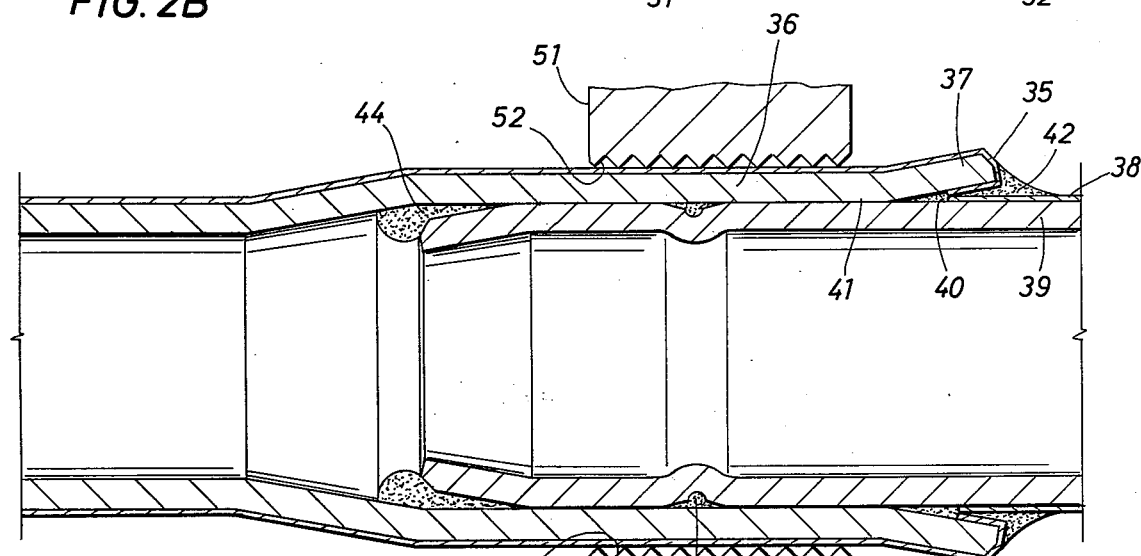
FIG. 3A similarly depicts the completed joint but illustrates a preferred arrangement for external coating.

Several variations of the externally-coated joint are possible. The joining procedure is essentially the same in all instances, the differences being primarily in the preparation of the ends prior to joining. In one, the external coating on the bell end is continued around the edge, down the inside of the flared portion of the bell, and into the straight portion of the bell for a short distance; the external coating on the pin end is not continued to the groove region but is terminated a short distance past the point of overlapping of bell and pin. In another, the external coating 35 on the bell is continued around the edge of the flared portion and terminated;

the external coating on the pin continues up to the groove region. In still another, as illustrated in FIG. 3A, the external coating 35 on the bell 36 is continued around the edge of the flared portion 37 and down the inside of said flared portion, and terminated near the point of transition 40 from the flared portion of the bell to the essentially straight portion 41 of the bell. When the bell 36 is so coated, it is necessary that the pin 39 be coated only to a distance which will permit the exterior coating 38 of the pin to engage the extended exterior coating of the bell 36 upon make-up. Lubricating sealant 42—either conventional or of high film strength—is applied to the pin, from the edge to just past the groove 43, and in an amount which will insure filling of the void 44 between pin and bell caused by the turndown of the pin. Sealant 42 is also preferably applied on the internal portion of the bell, in a circumferential ring of about ½ to 1 inch in width, beginning at the point at which the flared portion of the bell changes into the straight portion. The joint may then be made up in the normal manner, during which the space between the flared portion and the pin becomes filled with sealant.

Figure 3B:
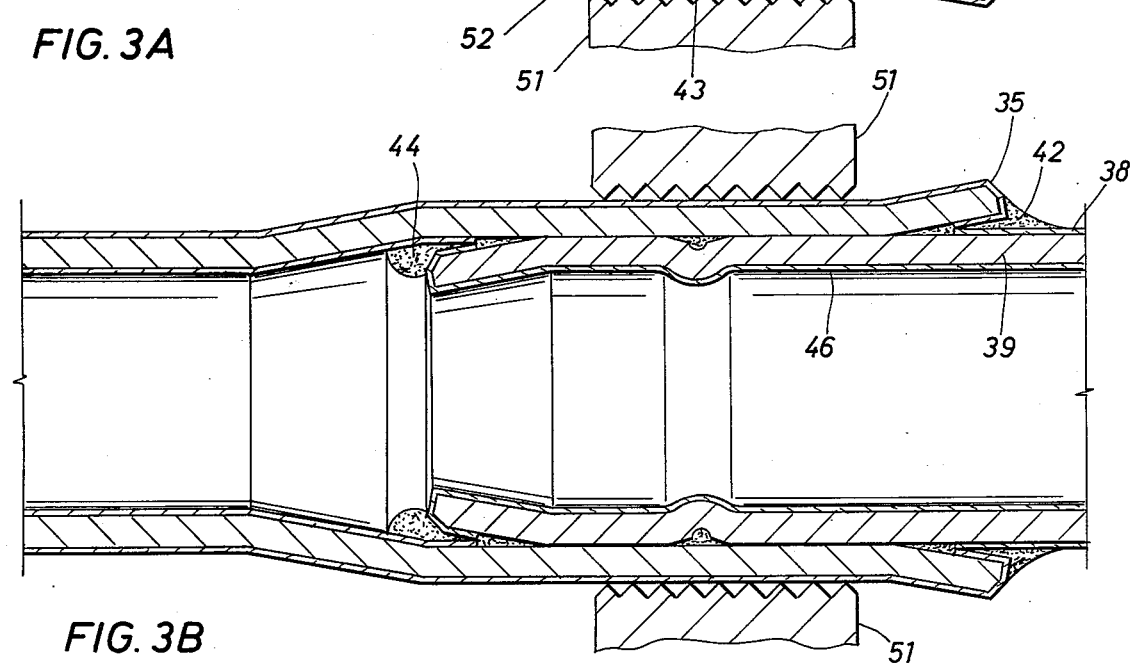
FIG. 3B illustrates a joint with both internal and external coating.

In FIG. 3B, the pin 39 is provided with an internal coating 46 which laps around the tapered end of the pin and extends to the outer diameter. Thus, a holiday free joint can be formed.

It will be recognized by those skilled in the art that two of the foregoing will provide a coating-to-coating seal when properly made up, and that the other will provide a coating-to-sealant-to-coating seal; it will also be recognized that overrunning or underrunning the nominal insertion depth will not leave an exposed area or "holiday" on the joint, the sealant occupying any voids between bell and pin and providing the necessary coverage. It will also be recognized that such joints as contain a grooved region will provide a double seal against internal pressure and at least a double seal against external pressure.

It will be apparent that the embodiments herein shown and described are exemplary only, and various modifications may be made in construction, materials and arrangement yet be within the scope of the invention as defined by the following claims:

I claim:

1. In a method of forming mechanical joints between tubular elements, of the type wherein a bell is formed in an end portion of one such element for receiving a pin end of the other element, the improvement comprising:
   tapering inwardly one end of tubular member to form a pin end and enlarging one end of another tubular member to form a bell end sized to receive a pin end with an interference fit,
   forming an annular groove on the exterior on a cylindrical wall portion of said pin end as near to said tapered end as practicable, and
   applying a lubricant-sealant to one of said ends so as to fill the angular space between said tapered end and said annular groove upon formation of said joint, and inserting said pin end into said bell end in interference fit.

2. The method as claimed in claim 1, including:
   wherein said tubular elements are steel and said bell is enlarged to a dimension not less than the minimum outer diameter of the other tubular member less the product of 0.005 times the nominal outer diameter of other tubular member whereby the bearing pressure between the outermost surface of the pin and the inner surface of said bell is insufficient to produce galling therebetween upon formation of said joint.

3. The method as claimed in claim 1, including:
   flaring outwardly at least a portion of said bell end.

4. In a method of forming a pin end on a tubular member to be inserted in an interference fit within a bell end of a tubular member having an open end portion with a terminal end which is flared outwardly at a first angle with respect to the central axis of the tubular member and with a lubricant sealant for filling the space between a pin end inserted into a bell end, the improvement for forming such a pin end for such a pin and bell interconnection comprising:
   forming an inwardly tapered portion on the terminal end of a pin end of a tubular member at an angle of 10° with respect to the central axis of the pin end where said 10° angle is greater than a first angle of the flared portion of a bell end of a tubular member by at least 6°,
   forming an annular groove in the outer circumferential surface of said pin end as near to said tapered portion as practical so that said groove and inwardly tapered portion are capable of containing a lubricant sealant; and
   inserting the pin into a bell end in an interference fit while filling the groove with a lubricant sealant.

5. A method of forming a pin end on a tubular member and a bell end on a tubular member where such pin end is inserted into such bell end and a lubricant-sealant is used for filling the space between the pin end inserted into a bell end, the improvement for forming such pin and bell ends to provide a minimum interference fit therebetween comprising:
   forming an outwardly flared portion on a bell end of a tubular member at a first angle with respect to the central axis of the bell end;
   forming an inwardly tapered portion on a pin end of a tubular member at a given angle with respect to the central axis of the pin end, where said given angle is greater than the first angle;
   forming an annular groove in the outer circumferential surface of said pin end near to said inwardly tapered portion and forming tapered relief portions on the edges of said groove thereby to remove the sharp edges of said groove;
   deforming at least one of said pin and bell ends relative to the other so that the pin and bell ends when interfitted will have a minimum interference fit there between;
   coating at least the internal portion of said bell end or the external portion of said pin end with a lubricant sealant; and
   inserting said pin end into said bell end in such minimum interference fitting relationship while filling the groove with said lubricant sealant.

6. In a method of forming a pin end on a tubular member to be inserted in an interference fit within a bell end of a tubular member having an open end portion which has a terminal and portion which is flared outwardly at an angle with respect to the central axis of the bell end and using a lubricant-sealant for filling the space between a pin end inserted into a bell end, the improvement for forming such a pin end for a pin and bell interference fitting comprising:
   forming an annular groove in the outer circumferential surface of a pin end of a tubular member at a location spaced from the terminal end of said pin end so that, upon insertion of said pin end into the bell end of a tubular member, the groove would be disposed within such a bell end;

providing a tapered relief portion on each edge surface of said groove thereby to eliminate sharp edges;

deforming the outer edge of the terminal end of said pin end to provide an inwardly tapered portion at an angle of 10° with respect to the central axis for said pin and thereby to minimize galling of the interior surface of a bell end upon insertion of said pin end; and inserting said pin end into said bell end in such interference fitting relationship while filling the groove with a lubricant-sealant.

7. In a method of forming a pin end on a tubular member and a bell end on a tubular member wherein such pin end is inserted into such bell end and a lubricant-sealant is used for filling the space between the pin end inserted into a bell end, the improvement for forming such pin and bell ends to provide a minimum interference fit therebetween comprising:

expanding one end of a tubular member to form a receiving bell end and controlling the expansion of said one end so that the inner diameter of the expanded end of the tubular member is a dimension not less than the minimum outer diameter of pin end on a tubular member less the product of 0.005 times the nominal outer diameter of the pin end on a tubular member;

applying a deforming force to the pin end of the tubular member to deform the terminal end of said pin end inwardly at an angle of ten degrees with respect to the central axis for said pin end thereby eliminate sharp edges which could cause galling upon insertion of such pin end into a bell end, and inserting the pin end into the bell end with such minimum interference fit therebetween while filling the space between the pin end and the bell end with a lubricant-sealant.

* * * * *